(12) United States Patent
Giannetti et al.

(10) Patent No.: US 11,579,941 B2
(45) Date of Patent: Feb. 14, 2023

(54) CONTROL CLUSTER FOR MULTI-CLUSTER CONTAINER ENVIRONMENTS

(71) Applicant: MASTERCARD INTERNATIONAL INCORPORATED, Purchase, NY (US)

(72) Inventors: Fabio Giannetti, Los Gatos, CA (US); John Zaiss, Valley Park, MO (US); Steven Borrelli, St. Louis, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 99 days.

(21) Appl. No.: 16/849,309

(22) Filed: Apr. 15, 2020

(65) Prior Publication Data

US 2020/0348984 A1   Nov. 5, 2020

Related U.S. Application Data

(60) Provisional application No. 62/843,537, filed on May 5, 2019.

(51) Int. Cl.

| | |
|---|---|
| *G06F 9/50* | (2006.01) |
| *G06F 11/30* | (2006.01) |
| *G06F 11/34* | (2006.01) |
| *G06F 16/23* | (2019.01) |
| *G06F 8/60* | (2018.01) |
| *H04L 61/3015* | (2022.01) |

(52) U.S. Cl.
CPC ............. *G06F 9/5083* (2013.01); *G06F 8/60* (2013.01); *G06F 11/3006* (2013.01); *G06F 11/3433* (2013.01); *G06F 16/2358* (2019.01); *H04L 61/3025* (2013.01)

(58) Field of Classification Search
CPC ...... G06F 9/5083; G06F 16/2358; G06F 8/60; G06F 11/3006; G06F 11/3433; G06F 9/5072; G06F 2209/505; H04L 61/3025; H04L 61/1511
See application file for complete search history.

(56) References Cited

U.S. PATENT DOCUMENTS

| | | |
|---|---|---|
| 7,730,091 B2 | 6/2010 | Buckler et al. |
| 8,412,810 B1 | 4/2013 | Tompkins |
| 8,949,308 B2 | 2/2015 | Chintalapati et al. |
| 8,984,101 B1 | 3/2015 | Viswanath et al. |

(Continued)

*Primary Examiner* — Sisley N Kim (57) ABSTRACT

The disclosure herein describes managing multiple clusters within a container environment using a control cluster. The control cluster includes a single deployment model that manages deployment of cluster components to a plurality of clusters at the cluster level. Changes or updates made to one cluster are automatically propagated to other clusters in the same environment, reducing system update time across clusters. The control cluster aggregates and/or stores monitoring data for the plurality of clusters creating a centralized data store for metrics data, log data and other systems data. The monitoring data and/or alerts are displayed on a unified dashboard via a user interface. The unified dashboard creates a single representation of clusters and monitor data in a single location providing system health data and unified alerts notifying a user as to issues detected across multiple clusters.

20 Claims, 6 Drawing Sheets

(56) References Cited

U.S. PATENT DOCUMENTS

| | | |
|---|---|---|
| 9,172,608 B2 | 10/2015 | Zeyliger et al. |
| 9,229,703 B1 | 1/2016 | Hamer |
| 9,270,521 B2 | 2/2016 | Tompkins |
| 9,367,360 B2 | 6/2016 | Jubran et al. |
| 9,729,615 B2 | 8/2017 | Nair |
| 10,225,335 B2 | 3/2019 | Fu et al. |
| 10,547,521 B1 * | 1/2020 | Roy .................... H04L 43/0817 |
| 2003/0225851 A1 | 12/2003 | Fanshier et al. |
| 2010/0332684 A1 | 12/2010 | Selitser et al. |
| 2016/0043892 A1 | 2/2016 | Hason et al. |
| 2017/0085419 A1 | 3/2017 | Zhang et al. |
| 2017/0249374 A1 | 8/2017 | Parees et al. |
| 2018/0288077 A1 * | 10/2018 | Siddiqui ................. G06F 21/56 |
| 2020/0174842 A1 * | 6/2020 | Wang ..................... H04L 67/10 |
| 2021/0279157 A1 * | 9/2021 | Woo ...................... G06F 11/302 |

\* cited by examiner

CONTROL CLUSTER FOR MULTI-CLUSTER CONTAINER ENVIRONMENTS

CROSS-REFERENCE TO RELATED APPLICATIONS

This application claims the benefit of U.S. Provisional Application No. 62/843,537, filed on May 5, 2019, the entirety of which is hereby incorporated by reference herein.

BACKGROUND

Applications are frequently run on a containerized cluster where other applications from the same entity are also running. In such cases, multiple applications run inside a single cluster. However, it may be desirable in some cases to run an application within a single container for improved security. In these cases, a separate cluster is required for each separate application. This requires "N" clusters for "N" different applications. Multiple clusters improve security but create additional burdens in cluster maintenance, updating and other operations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing multiple containerized clusters within an environment is described. A cluster manager component deploys one or more workloads to one or more clusters within a plurality of clusters. The cluster manager component includes a single deployment model which controls deployment of cluster components to the one or more clusters within the plurality of clusters. The cluster manager component receives monitor data from two or more clusters for aggregation within a data store associated with the control cluster. The monitor data includes metrics data and/or log data associated with two or more clusters within the plurality of clusters. The monitor data and/or a set of alerts are displayed on a unified dashboard associated with a user interface. The set of alerts identify multi-cluster status updates associated with the cluster(s).

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a computerized method and system for managing multiple clusters at the cluster level using a control cluster within a containerized environment. Deploying multiple containerized clusters simultaneously improves security for the applications running inside each cluster. However, as the number of clusters increases, the time and resources required to create, maintain, update and/or operate those clusters increases proportionately. As the number of clusters increases, the burdens associated with maintenance can become cost prohibitive.

A control cluster is a containerized cluster in accordance with some examples for maintaining multiple containerized clusters automatically. The control cluster deploys workloads to all other clusters within the environment, gathers all monitoring data and log data from the clusters, as well as logging into a unified dashboard having a single pane-of-glass view for outputting unified monitoring data and unified alerts associated with the clusters to a user. This enables improved user efficiency via user interface interaction, improved security through the multiple clusters and reduced error during deployment and operation of clusters.

The control cluster in some examples includes a single deployment model that gives the control cluster exclusive control over deployment of applications (workloads), containers and other core components of the clusters. In other words, the control cluster has management control over deploying/provisioning clusters within the environment.

The control cluster operates in an unconventional way by aggregating monitoring data from the plurality of clusters in a centralized data store and providing a single representation of clusters and alerts on a unified dashboard. The monitoring data includes metrics data, log data and other systems data. The control clusters utilize the aggregated data to manage control over deploying/provisioning clusters, performing updates and other management tasks associated with the clusters. The control cluster monitors changes or updates made clusters. If a change or update is applied to one cluster, the control cluster automatically propagates the change/update to other applicable clusters in the same environment, thereby reducing system update time across clusters and improving consistency and accuracy of updates across multiple clusters. The control cluster provides a higher degree of isolation between applications by using clusters on top of namespaces while maintaining operation costs comparable to running a single cluster per environment.

Further, the control cluster visualizes/outputs unified monitoring data and/or alerts on a unified, single pane-of-glass type of dashboard display (console) via a user interface. The unified dashboard provides a single representation of clusters and monitor data in a single location. The unified dashboard of the disclosure further provides pertinent data, system health and unified alerts associated with issues occurring in real-time across a plurality of clusters within the system. The unified alerts notify user(s) as to issues detected across multiple clusters within the environment.

The dashboard further reduces or eliminates alerting mechanisms associated with each individual cluster. This improves the user efficiency identifying problems or faults in the system, as well as reducing time required to identify issues and the number of alert mechanism/alerts generated by the system. The unified alerts further remove the ambiguity of multiple alerts coming from individual clusters, reduces the overall number of alerts output to the user and makes the alerts more relevant/informative to the user.

Figure 1:
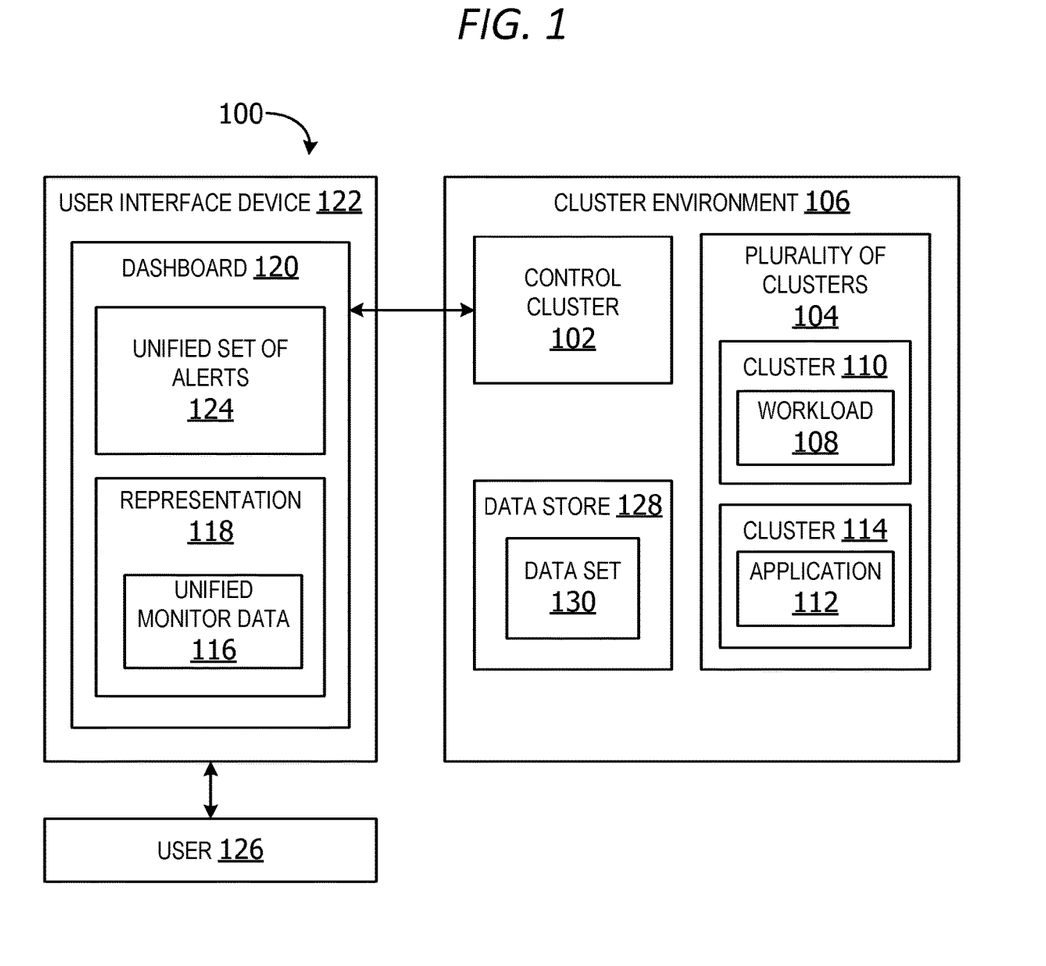
FIG. 1 is an exemplary block diagram illustrating a system configured for managing multiple clusters in a container environment according to an embodiment.

FIG. 1 is an exemplary block diagram illustrating a system 100 configured for managing multiple clusters in a container environment according to an embodiment. The system 100 includes a control cluster 102 configured to manage a plurality of clusters 104 within the cluster environment 106. The control cluster 102 is a master cluster that controls/manages and monitors other clusters within the cluster environment 106.

The cluster environment 106 is an environment or platform supporting multiple containerized clusters, such as, but not limited to, the control cluster 102 and/or the plurality of clusters 104. The cluster environment 106 in some non-limiting examples can be a KUBERNETES environment including one or more KUBERNETES clusters. However, the examples are not limited to KUBERNETES environments. The cluster environment 106 can include other containerized environments. For example, the cluster environment can include snowflake clusters utilizing a snowflake schema to support query needs associated with cloud data warehouse (DW) running on multiple clusters. The cluster environment can also be referred to as a containerized environment or container environment.

The cluster environment 106 can be implemented within a local, physical server device, a set of servers, on a cloud, or on a set of two or more clouds. For example, the cluster environment 106 can include, without limitation, a public cloud, a private cloud and/or one or more data centers. In this manner, the system can run workloads with a higher degree of isolation using separate KUBERNETES clusters for different applications on local server(s) (on-premises) and/or in cloud deployments.

The control cluster 102 is a containerized cluster receiving deploy code to be deployed on another cluster. The control cluster 102 controls deployment of the deploy code, including applications, components and/or workloads, to clusters in the plurality of clusters.

The control cluster 102 prevents a user from deploying workloads or other cluster (system/platform) components directly to a cluster in the plurality of clusters. Instead, the control cluster 102 validates deployment attempts to determine whether to allow deployment of a workload/component on a selected cluster or deny the deployment. If deployment is permitted, the deployment code enables the deployment to the selected cluster. In most examples, workloads and other components are deployed to a pod or container on a cluster.

A workload can include an application. A cluster component can include a container, pod, namespace, or other components. A namespace can include a non-system namespace or a system namespace, such as a KUBE-system namespace or a process knowledge system (PKS) system namespace. Other components can include PKS infrastructure and/or software defined network components.

The plurality of clusters 104 includes two or more containerized clusters within the cluster environment 106. The plurality of clusters 104 can include any number "N" of clusters. It should be understood that, while only two clusters are illustrated in FIG. 1, the system 100 may include more, fewer, or different numbers of clusters in the plurality of clusters 104 managed by the control cluster 102 without departing from the description.

Each cluster in the plurality of clusters 104 can support one or more workloads. A workload can include an application, job, batch job or any other type of task deployed to a cluster. A cluster can include a single, isolated workload (application), such as, but not limited to, the workload 108 running on cluster 110 or the application 112 on cluster 114. It should be understood that, while only one workload 108 and one application 112 are illustrated, the system 100 may include more, fewer, or different numbers of workloads and/or applications deployed on one or more clusters without departing from the description herein.

The control cluster 102 receives monitor data from each cluster in the plurality of clusters. The plurality of clusters push or send monitoring data to the control cluster 102 automatically. The control cluster 102 can aggregate the data in a data store. The control cluster 102 performs analysis on the received (aggregated) data to generate unified monitor data 116.

In some examples, the clusters send the monitoring data to the control cluster 102 at a predetermined time or after a user-configured predetermined time-interval. For example, monitoring data may be sent to the control cluster 102 every second, every minute or every hour.

In other examples, the clusters push/send the monitoring data to a data store for aggregation. If the data is pushed to a data store, the control cluster 102 retrieves or pulls the data from the data store. In other examples, the monitor data is pushed directly to the control cluster 102 by each cluster in the plurality of clusters.

The unified dashboard 120 is a single pane-of-glass type of management console displaying status data associated with the plurality of clusters to a user via a user interface device 122. The control cluster 102 in some examples displays a representation 118 of the unified monitor data 116 on a unified dashboard 120 display via the user interface device 122. The representation 118 is a visualization of the monitor data and/or alerts. The representation 118 can include a graphical representation, such as an icon, graph or other visual representation of the monitor data and/or alerts. The user interface in some non-limiting examples is a graphical user interface (GUI) providing graphical icons/graphical representation of the status, metric data and/or log data associated with the plurality of clusters.

In some examples, the dashboard 120 includes logging tools that visualize (present/display) data from any cluster and namespace within the environment. In these examples, logs are sent to a centralized place, such as the data store. In the centralized storage location, an elastic search can be performed by the control cluster 102. The logs can include, without limitation, base logs, system logs and/or environment logs associated with the clusters. In this example, the logs are not application logs. The logs can be augmented with the names of the clusters. The control cluster 102 can access/search all the logs from all the clusters and all the nodes via the centralized logging of cluster-related data.

In other examples, the dashboard 120 also provides a unified set of alerts. The control cluster 102 in other examples analyzes the unified monitor data 116 using one or more user-configured threshold(s) and/or rules to generate a unified set of alerts 124. The unified set of alerts 124 includes one or more alerts displayed or otherwise output to the user 126 via the user interface device 122. An alert in the unified set of alerts 124 provides a warning or indicator of a possible issue occurring in real-time across multiple clusters within the plurality of clusters 104.

As used herein, the term issue refers to any type of problem, such as, but not limited to, a resource utilization problem, software problem, hardware malfunction, loss of power, loss of network connectivity, performance problem, runtime error, etc. In some examples, an issue can include detection of an execution lag time, overutilization of resources, processing delays, and/or any other type of performance-related issue associated with one or more workloads running in one or more clusters.

In one example, if a load on a single cluster is lost, no alert is provided. However, if multiple nodes across multiple clusters is detected, it indicates a problem at the multi-cluster level. In this example, a unified alert providing data describing the lost/crashed nodes is output to the user via the unified dashboard.

In another example, if a single workload on a single cluster is experiencing a processing lag time, no unified alert is issued. However, if workloads on multiple clusters are suffering from a lag time, the system outputs a unified alert associated with the lag time occurring on workloads on multiple clusters. The alert is output to the user via the dashboard.

An alert in the unified set of alerts 124 in this example includes a graphical icon, graphical representation or other visual element displayed on the dashboard. In other examples, the alert can include an audible alert, a haptic alert, an alert that includes both a graphical (visual) representation and an audible (sound) alert, a combination of a graphical, audible and haptic alert, as well as any other type of alert.

The system 100 in other examples can include a data store 128. The data store 128 can include an object storage. The data store 128 stores combined (aggregated) data set 130. The data set 130 includes the monitor data received from the plurality of clusters. The data store 128 provides a centralized data store for storing/locating data associated with multiple clusters in the system. In some examples, the unified set of alerts are performed on the combined data set 130 instead of being separate for each cluster.

Thus, the control cluster 102 in some examples allows or denies deployment of applications in any of the clusters within the environment. The control cluster 102 centralizes metrics coming from all the clusters and provides a single place to present/visualize them and perform alerts.

Alerts are generated based on evaluation of monitoring data collected from all clusters with performance thresholds and/or queries. The system can also provide alerting across multiple metrics coming from different multiple clusters. For example, if a signal or other data is not received from an application for ten minutes, the system assumes the application instance is down or it has lost connectivity and an alert should be issued. Another threshold may specify that an alert should be issued if ten or more nodes are down/lost connectivity. Instead of receiving ten alerts, the user only receives a single alert for the ten lost nodes.

The control cluster 102 further centralizes logs providing a single place to see issues at the cluster level. In this manner, the control cluster 102 enables running applications in dedicated containerized clusters to run workloads with a high degree of isolation while minimizing time, labor and costs associated with maintaining and/or monitoring a plurality of containerized clusters.

The clusters in the plurality of clusters can include any type of Kubernetes cluster. For example, a cluster in the plurality of clusters can be a single tenant cluster or a multi-tenant cluster. A multi-tenant cluster is a cluster which is shared by two or more tenants. A tenant can refer to a user or a workload. Cluster multi-tenancy can be used to minimize harm to other tenants if one of the tenants is malicious or security compromised. The clusters within the Kubernetes environment are described in greater detail below with respect to FIG. 2.

Figure 2:
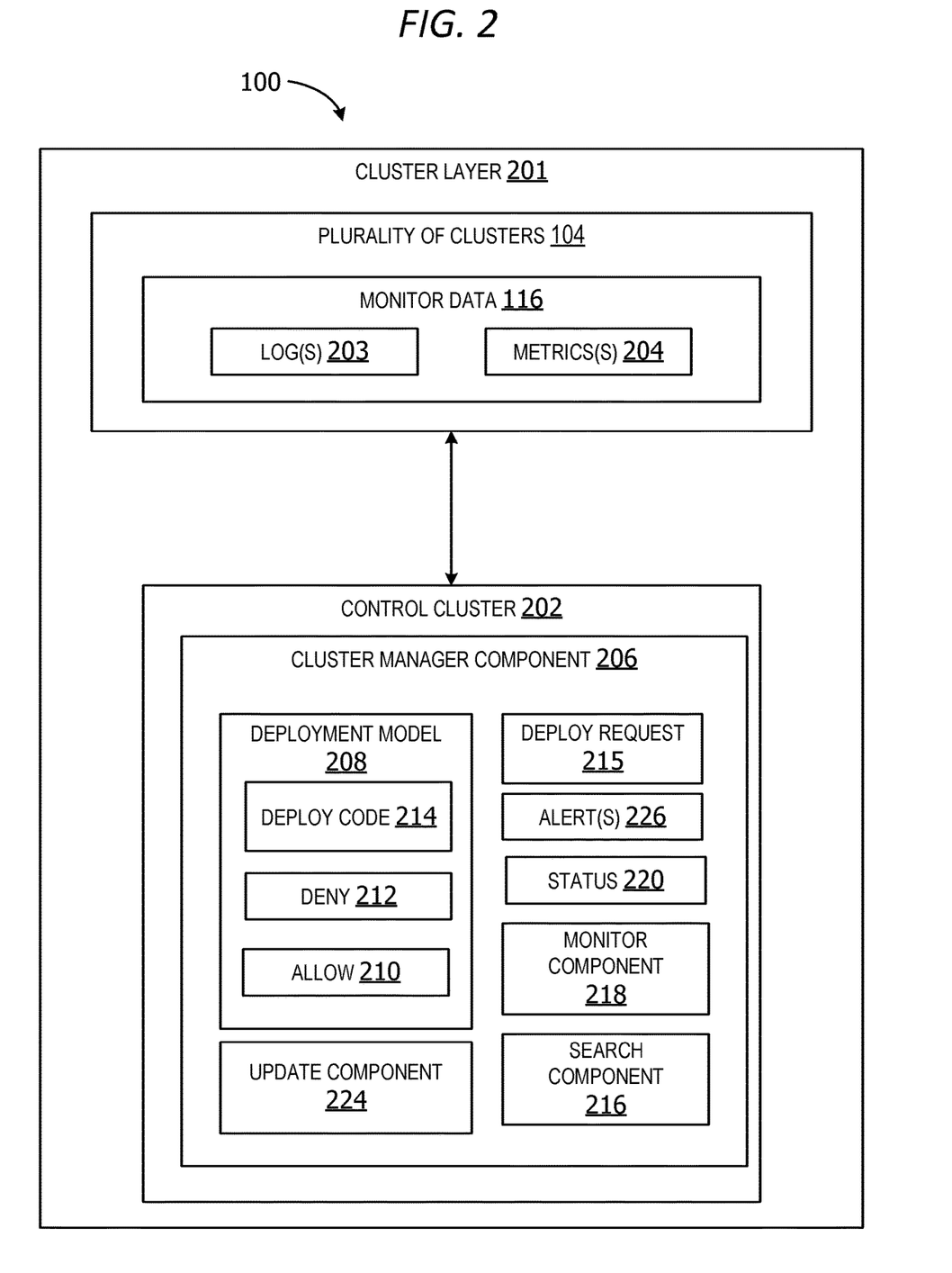
FIG. 2 is an exemplary block diagram illustrating a system configured for managing clusters, including a control cluster, according to an embodiment.

FIG. 2 is an exemplary block diagram illustrating a system 100 configured for managing clusters, including a control cluster 202, according to an embodiment. The control cluster 202 is a cluster for managing one or more other clusters, such as, but not limited to, the control cluster 102 in FIG. 1. The control cluster 202 receives monitor data 116 from each cluster in the plurality of clusters 104 at a cluster layer 201. The monitor data 116 can include system log(s) 203 and/or metric 204 data.

Metrics and logs are sent to the control cluster 202. This provides a centralized place to monitor the clusters and application health of applications running on the plurality of clusters.

The control cluster 202 in some examples include a cluster manager component 206. When a user wants to deploy a workload or other component on one or more selected clusters in the plurality of clusters, the deploy request 215 or deploy attempt goes through a single deployment model 208 associated with the control cluster 202. The deployment model 208 analyzes the deployment request along with any relevant rules, permissions, authorizations, configuration requirements, or other criteria to determine whether to allow 210 or deny 212 deployment on the selected cluster(s).

The deployment model includes a deployment tool, such as, but not limited to, "argo cd." In some examples, the "argo cd" tool runs on the control cluster 202. An example is as follows:

```
apiVersion: argoproj.io/v1alpha1
kind: Application
metadata:
    name: $(CLUSTER_NAME)-$(APPLICATION_NAME)
    namespace: argocd
spec:
    destination:
            namespace: $(APPLICATION_NAMESPACE)
            server: $(CLUSTER_URL)
            project: $(PROJECT_NAME)
        source:
            path:
    environments/stl.dev/deployments/$(CLUSTER_NAME)/$(APPLICATION_NAME)
            repoURL:
    https://globalrepository.mastercard.int/stash/scm/kube_environments.git
            targetRevision: HEAD.
```

The control cluster 202 is the only cluster within the container environment including a deployment tool for deploying clusters, cluster components and/or workloads to clusters. In this manner, deployment and updating to the clusters is limited/controlled by the control cluster 202.

If deployment is allowed/authorized by the cluster manager component 206, the deploy code 214 is permitted to deploy (enables deployment) onto the selected cluster. The deploy code 214 may include code associated with an application, workload or other component being deployed onto the selected cluster(s). If deployment is not allowed/unauthorized, the control cluster 202 prevents deployment or fails to deploy the deploy code 214.

The authorization can include verifying that the deployment/update is coming from an authorized user, the update/deployment is compatible with other applications/platforms on the cluster, the update/deployment is the most up-to-date version or compatible version, etc. In one example, a platform component deployment may be unauthorized/denied or otherwise rejected if the user attempting to deploy the platform component lacks authorization to make changes to the platform. In another example, deployment of an application may be denied/unauthorized if the application is not compatible with other operating system/platform component(s) running on the container.

If a version of an application is updated by a user from a previous version to a newer version, for example, the control cluster 202 monitors that update. The change is made once in code and the control cluster 202 identifies all clusters running the previous version of the software. The control cluster 202 automatically applies the change to all those identified clusters. All clusters are updated simultaneously.

Thus, the change made in one place is propagated to all relevant clusters automatically. This enables uniformity of component versioning across different environments. The control cluster 202 prevents different versions of software from running on different clusters in the environment.

In other examples, a search component 216 performs searches of data received from the plurality of clusters to identify relevant monitor data. The monitor data 116 is analyzed by a monitor component in other non-limiting examples to determine status 220 of each cluster in the plurality of clusters. The monitor component 218 updates status data on the dashboard based on real-time monitor data received dynamically from the plurality of clusters.

If the monitor data 116 indicates an issue or performance problem occurring across multiple clusters in the plurality of clusters, the monitor component 218 can generate alert(s) 226. The alert(s) 226 are output to a user via the dashboard. The alert(s) 226 can include one or more alerts, such as, but not limited to, the unified set of alerts 124 in FIG. 1.

In other non-limiting examples, the control cluster 202 can include an update component 224. The control component monitors updates/changes made to clusters in the plurality of clusters. If a component or application on a cluster is updated to a newer version, the update component 224 propagates the change/update to all other relevant clusters using the same/similar component or application. In this manner, a user applies a single change/update to a single software component on a single cluster and the system automatically pushes that update to all applicable clusters to maintain consistency of application versions and updates across all clusters.

Figure 3:
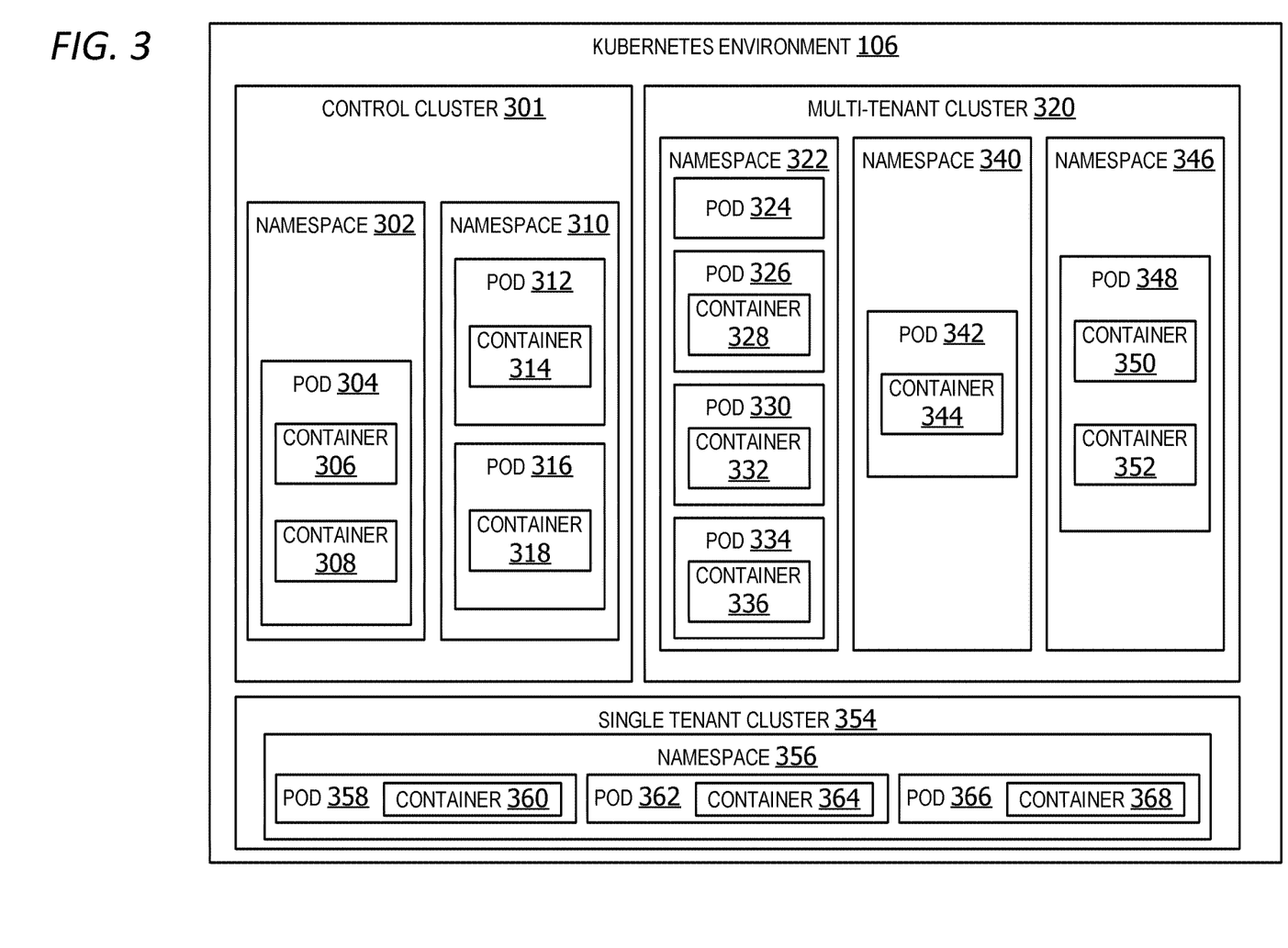
FIG. 3 is an exemplary block diagram illustrating a control cluster managing a plurality of clusters in a container environment.

FIG. 3 is an exemplary block diagram illustrating a control cluster 301 managing a plurality of clusters 104 in a cluster environment 106. The control cluster 301 is a cluster which utilizes aggregated monitoring data to perform maintenance and monitoring of a plurality of containerized clusters, such as, but not limited to, a control cluster 102 in FIG. 1 and the control cluster 202 in FIG. 2.

In this non-limiting example, the control cluster 301 sits on top of a namespace 302 including a single pod 304 associated with a first container 306 and a second container 308. In this example, the namespace 302 can be associated with a monitor component, such as, but not limited to, the monitor component 218 in FIG. 2.

A pod is a basic execution unit of a containerized application. A pod wraps or encapsulates one or more containers, resources, options controlling how the container(s) should run and/or a network internet protocol (IP). The system can manage the pod(s) rather than directly managing the container(s). The pod 304 in this example encapsulates two containers. In other examples, the pod 304 can encapsulate no containers, a single container, as well as three or more containers.

The control cluster 301 can include, without limitation, a namespace 310 having a first pod 312 supporting a single container 314 and a second pod 316 having a single container 318. Each container can likewise include one or more applications (workloads). It should be understood that, while only two namespaces 302 and 310 are illustrated in the control cluster 301, the control cluster 301 may include more, fewer, or different numbers of namespaces associated with the control cluster 301 without departing from the description herein.

A cluster in the plurality of clusters being monitored and managed by the control cluster 301 can include a single tenant cluster or a multi-tenant cluster, such as, but not limited to, the multi-tenant cluster 320. A tenant is an entity, organization, application, workload or user. A multi-tenant cluster is a cluster shared or used by multiple tenants. For example, a multi-tenant cluster can include a first instance of an application "A" for a first entity running on a pod associated with a first namespace, a second instance of the application "A" for the first entity running on a second pod associated with a second namespace, and a first instance of an application "B" for the second entity running on a third pod associated with a third namespace.

In the example shown in FIG. 3, the multi-tenant cluster includes a namespace 322 support a pod 324 having no containers, a pod 326 having a container 328, a pod 330 having a container 332 and a pod 334 having a container 336.

The namespace 322 in this example includes four pods. In other non-limiting examples, the namespace 322 can include no pods, a single pod, two pods, three pods, as well as five or more pods. For example, the namespace 340 in this non-limiting example includes a single pod 342 enclosing a single container 344. The namespace 346 includes a single pod 348 associated with a container 350 and a container 352.

The plurality of clusters can also include a single-tenant cluster 354. The single tenant cluster 354 in this example includes a namespace 356 associated with a pod 358 having a container 360, a pod 362 having a container 364 and a pod 366 having a container 368. While the plurality of clusters having only two clusters are illustrated in the cluster environment 106, the cluster environment 106 may include more, fewer, or different numbers of clusters without departing from the description herein.

The multi-tenant cluster(s) within the cluster environment 106 can include namespaces that are associated with different tenants, while the single-tenant cluster(s) have namespace(s) associated with only one tenant. The control cluster namespaces can also be associated with monitoring functionality and with create/deploy tools, such as, but not limited to, an "argo-cd" tool used to create/deploy new clusters within the cluster environment 106.

As shown in the example of FIG. 3, the cluster environment 106 includes a single control cluster, one or more single tenant clusters and one or more multi-tenant clusters. However, the examples are not limited to environments including all three types of clusters. In other examples, the cluster environment 106 can include a single control cluster and one or more single tenant clusters without any multi-tenant clusters. In yet other examples, the cluster environment 106 includes a single control cluster and one or more multi-tenant clusters without any single tenant clusters.

In one example, the system includes a "Git" version control system for deploying clusters and cluster components, as well as updating the clusters within the cluster environment 106. A "Git" is used to change cluster configuration or deploy an update on a selected cluster in a plurality of clusters managed by a control cluster 301.

In one non-limiting example, the control cluster 301 receives a cluster reconciliation descriptor (CRD) associated with an attempted deployment against a control cluster 301, such as the following:

```
apiVersion: kubernetes.mc.int/v1beta1
kind: ClusterSpec metadata:
    name: cluster-specification
    spec: clusterURL: https://test.stl-dev.mc.int:8443
        clusterName: card-loyalty
        baseFQDN: stl-dev.mc.int
            clusterType: cardLoyalty
        inheritFromTypes:
            - singleTenant
            - piiData
            - pciCompliant
        clusterNodes: 10
        clusterPlan: medium.
```

The control cluster 301 uses a templating tool to create a template, such as HELM software for templating and "Kustomize" for manifests. Overlays can be used to customize for tenants (i.e. ingress).

A non-limiting example of "Kustomize" overlay is provided below:

```
apiVersion: kustomize.config.k8s.io/v1beta1
kind:Kustomization
resources:
        -cluster-spec.yaml
vars:
- name: CLUSTER_NAME
objref:
        kind: ClusterSpec
        name: cluster-specification
        apiVersion: kubernetes.mc.int/v1beta1
        fieldref:
            fieldpath: spec.clusterName
    - name: CLUSTER_FQDN
        ...
    - name: CLUSTER_URL
```

The control cluster 301 can utilize a storage area network (SAN) volume controller (SVC) CRD for managing cluster data associated with cluster deployments within the container environment. An example of control cluster a-la-carte SVCs CRD is shown below.

```
apiVersion: kubernetes.mc.int/v1beta1
kind: MappingSpec
metadata:
    name: a-la-carte-specification
    app-name: mc-loyalty
spec:
    cardLoyalty:
        project: card-loyalty-services
        apps:
            -   name: storage-service
                folderName: storage-service
                baseURL: ../../../../../a-la-carte-deployments/
                automatedSync: true
            -   name: queue-service
                folderName: queue-service
                baseURL: ../../../../../a-la-carte-deployments/
                automatedSync: true.
```

The control cluster maps core services, such as monitoring and logging, to clusters, such as single tenant clusters. An example of control cluster mapping CRD is shown below.

```
apiVersion: kubernetes.mc.int/v1beta1
kind: MappingSpec
metadata:
    name: mapping-specification
spec:
    core :
        project: core-services
        apps:
                - name: monitoring ...
                - name: logging ...
    singleTenant:
        ...
    piiData:
        project: pii-services
        apps: ...
                - name: pii-logging
    pciCompliant:
        project: pci-services
        apps: ...
```

The control cluster ensures the declared and actual states match. The control cluster can use "argo-cd" to perform a difference operation and update all relevant clusters to match the update/deploy data associated with the "Git." An example of the control cluster customize deployments is as follows:

```
apiVersion: kustomize.config.k8s.ro/v1beta1
kind: Kustomization
bases:
- ../../../../../pii-deployments/pii-logging
- ../../../specs/clusters/kube.
```

Overlays can also be customized. The control cluster utilizes a unified dashboard to display a visualization of monitoring data, status of clusters and/or alerts. In some examples, visualizations are provided via an open-source data visualization plug-in, such as, but not limited to, KIBANA. An example is as follows:

```
pii-logging ->
    kustomization.yaml
    patch-kibana-deployment.yaml
    patch-kibana-ingress-host.yaml
    patch-kibana-storage.yaml.
```

Another example associated with the control cluster utilization of visualization plugin is as follows:

```
-       op: replace
        path: /spec/rules/0/host
        value:
kibana.$(APP_NAME).$(CLUSTER_NAME).$(CLUSTER_FQDN)
-       op: replace
        path: /spec/tls/0/hosts/0
        value:
kibana.$(APP_NAME).$(CLUSTER_NAME).$(CLUSTER_FQDN)
```

Figure 4:
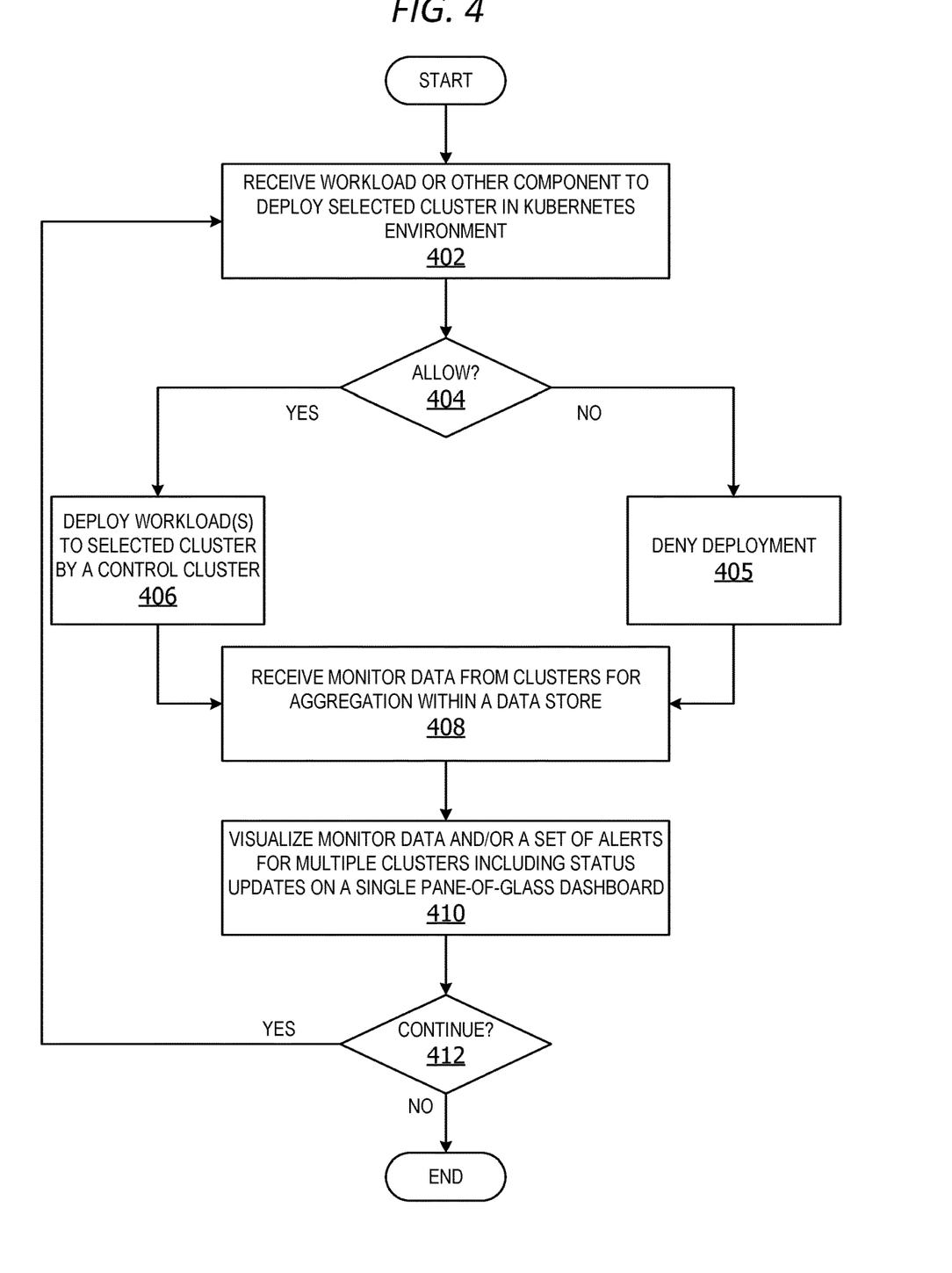
FIG. 4 is an exemplary flow chart illustrating a method of managing a plurality of clusters in a container environment according to an embodiment.

FIG. 4 is an exemplary flow chart illustrating a method 400 of managing a plurality of clusters in a containerized environment according to an embodiment. It should be understood that the method 400 as described may be implemented and/or executed by one or more components of a system such as systems 100 described above with respect to FIGS. 1 and 2. At 402, a workload or other component is received by a control cluster for deployment to a selected cluster in a containerized environment. The control cluster is a cluster including a cluster manager component, such as, but not limited to, the control cluster 102 in FIG. 1, the control cluster 202 in FIG. 2 and/or the control cluster 301 in FIG. 3.

At 404, the cluster manager component on the control cluster determines whether to allow the deployment or deny deployment based on system configurations, permissions, security authorizations, deployment rules, etc. If deployment is not allowed, the control component denies deployment at 405 and the workload or component remains undeployed. If deployment is allowed at 404, the cluster manager component deploys the workload(s) or other components to the selected cluster at 406.

At 408, the control cluster receives monitor data from the plurality of clusters for aggregation within a data store at 408. The control cluster provides a representation or other visualization of monitor data and/or a set of unified alerts for multiple clusters at 410. The representation can be presented to a user on a user interface device, such as, but not limited to, the user interface device 122 in FIG. 1. The representations (visualizations) include status updates and/or alert(s) associated with multiple clusters being managed by the control cluster. The representations are presented to the user on a single pane-of-glass dashboard.

At 412, the control cluster determines whether to continue. If yes, the process iteratively executes operations 402 through 412. If a determination is made not to continue at 412, the process terminates thereafter.

Figure 5:
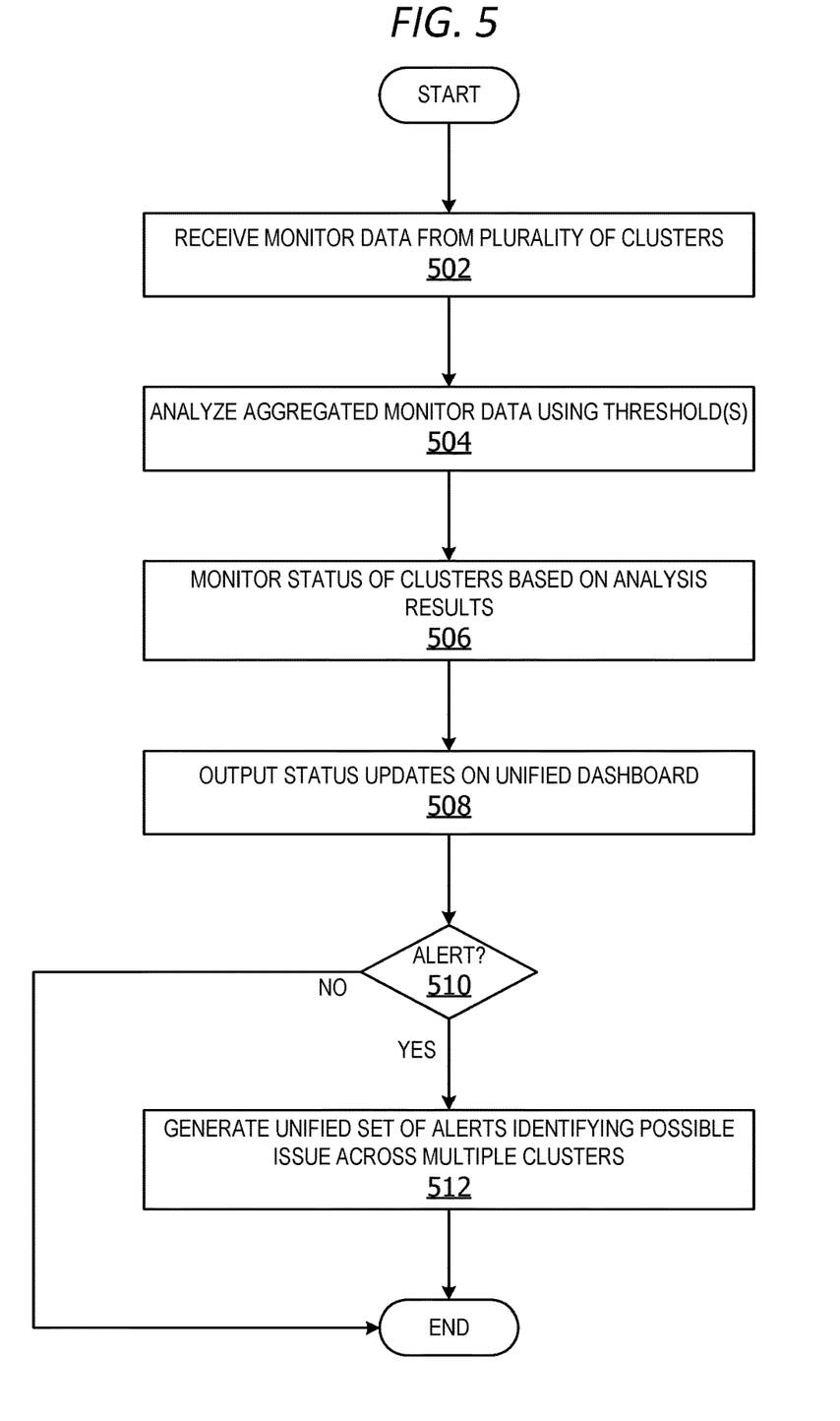
FIG. 5 is an exemplary flow chart illustrating a method of managing a plurality of clusters, including generating and providing a unified set of alerts and updates across clusters on a single pane-of-glass dashboard according to an embodiment.

FIG. 5 is an exemplary flow chart illustrating a method 500 of managing a plurality of clusters, including generating and providing a unified set of alerts and updates across clusters on a single pane-of-glass dashboard according to an embodiment. It should be understood that the method 500 as described may be implemented and/or executed by one or more components of a system such as system 100 described above with respect to FIGS. 1 and 2.

At 502, the control cluster receives monitor data from a plurality of containerized clusters. At 504, the cluster manager component of the control cluster analyzes the aggregated monitor data using one or more threshold(s). The control cluster monitors status of clusters based on the analysis results at 506. At 508, the dashboard outputs status updates associated with the plurality of clusters. At 510, the cluster manager component determines whether to output an alert based on the monitor data. If yes, the cluster manager component generates a unified set of alerts identifying one or more possible issues across multiple clusters in the plurality of clusters. The unified alert(s) are output via a user interface device or another input/output device. The process terminates thereafter.

Additional Example Scenarios

Aspects of the disclosure enable various additional scenarios, such as next described. In one non-limiting example, a given environment may have several KUBERNETES clusters where each cluster runs one or more applications. KUBERNETES is a portable open-source platform operating at a container level for managing workloads running on clusters. Each cluster in a KUBERNETS environment needs to be maintained and monitored like any other infrastructure component. The maintenance and operations needs are multiplied as each new tenant and/or application specific cluster is added to the environment. The control cluster applies control to this system at the cluster level. The control cluster determines who and what can be deployed in each cluster.

The control cluster in another example is only accessed by one or more authorized users managing the platform. In this manner, users are prevented from deploying code directly onto any clusters. The deploy code is deployed against the control cluster which validates deployment to the selected cluster(s). In this manner, the control cluster determines if deploy code can or cannot deploy on a given cluster.

In another example scenario, when legacy applications are moved to containerized workloads, security concerns and other requirements are constraints to be considered. Multi-tenant clusters can provide greater security, common services and structured onboarding for tenants. A single control cluster is provided for each environment to manage deployments and provide global monitoring of workloads running in multiple clusters. Single-tenant clusters are provided where workloads are associated with hard security requirements. Multi-tenant clusters can be utilized with soft multi-tenancy.

Deployment of base services is automated, such as, by "Git" operations (Ops). The clusters and/or workloads can be customized for tenants' unique needs. Security is achieved via improved tenant isolation and multi-tenancy namespace isolation, utilizing role-based access control (RBAC). Those who require hard multi-tenancy have dedicated cluster.

The system can be used to provide a set of common services to tenants, such as, but not limited to, unified alerts, ingress, monitoring, logging, tracing, cluster designation (CD), also referred to as cluster classification, easy onboarding, as well as other common services needed by all tenants/workloads.

Exemplary Operating Environment

Figure 6:
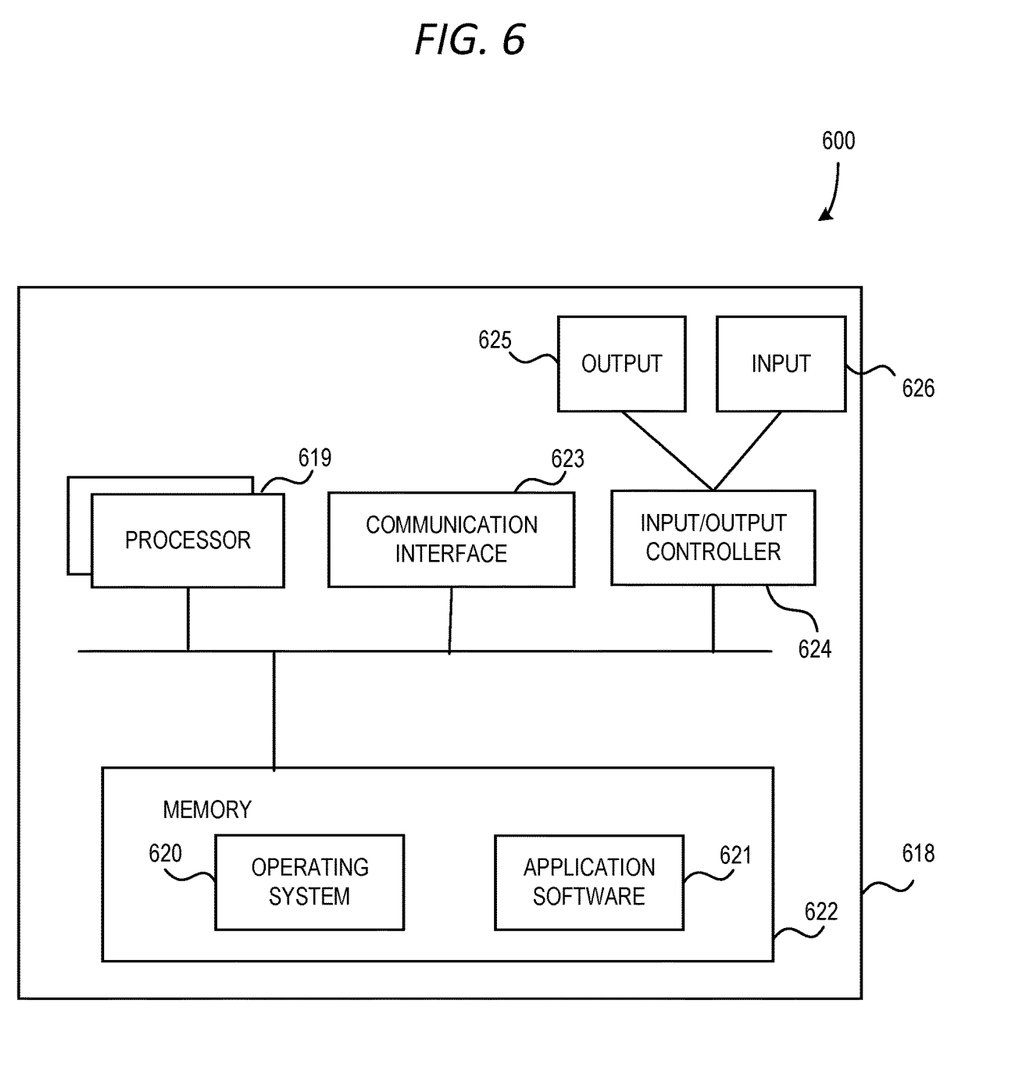
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, monitoring a plurality of clusters and generating unified alerts associated with issues across multiple clusters, as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: deploy one or more workloads to one or more clusters within a set of clusters associated with a containerized environment; receive monitor data from two or more clusters for aggregation within a data store associated with the control cluster; and display at least one of the monitor data and a set of alerts on a unified dashboard associated with a user interface. The monitor data and/or alerts identifying multi-cluster status updates associated with the two or more clusters based on the monitor data and at least one threshold.

A computerized method for managing containerized clusters using a control cluster comprises: deploy one or more workloads to one or more clusters within a set of clusters associated with a container environment; receive monitor data from two or more clusters for aggregation within a data store associated with the control cluster; and display at least one of the monitor data and a set of alerts on a unified dashboard associated with a user interface. The monitor data and/or alerts identifying multi-cluster status updates associated with the two or more clusters based on the monitor data and at least one threshold.

One or more exemplary non-transitory computer readable storage media comprises computer-executable instructions for managing containerized clusters at a cluster level that, upon execution by a processor, cause the processor to at least: deploy one or more workloads to one or more clusters within a set of clusters associated with the container environment; receive monitor data from two or more clusters for aggregation within a data store associated with the control cluster; and display at least one of the monitor data and a set of alerts on a unified dashboard associated with a user interface. The monitor data and/or alerts identifying multi-cluster status updates associated with the two or more clusters based on the monitor data and at least one threshold or other rules/criteria.

Alternatively, or in addition to the other examples described herein, examples include any combination of the following:
  wherein deploy workload operations includes receiving, by the user interface, a workload for deployment on a selected cluster in the set of clusters; validating the workload and at least one cluster in the set of clusters; allowing deployment of the workload onto the selected cluster in response to validation of the workload by the control cluster; and denying deployment of the workload on the selected cluster in response to failure to validate the workload;
  the unified dashboard provides a single-pane-of-glass management console presenting monitor data and alerts for multiple clusters in the set of clusters;
  wherein the dashboard provides a centralized location for display (visualizing) and performing alerts;
  wherein receiving the monitor data further includes aggregating the monitor data received from the two or more clusters; analyzing the monitor data using at least one threshold; monitoring status of the set of clusters based on a result of the analysis of the monitor data; and outputting a status of the one or more clusters in the set of clusters by the unified dashboard;
  generate at least one alert in response to monitor data indicating performance or state of the two or more clusters in the set of clusters falling below at least one threshold;
  wherein the at least one memory and the computer program code is configured to, with the at least one processor, further cause the at least one processor to centralize a plurality of logs associated with a plurality of clusters within the set of clusters, by the cluster manager component;
  wherein the at least one memory and the computer program code is configured to, with the at least one processor, further cause the at least one processor to identify at least one issue associated with the plurality of clusters for output/presentation by the dashboard; and
  wherein the at least one memory and the computer program code is configured to, with the at least one processor, further cause the at least one pro Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for deploying one or more workloads to one or more clusters within a set of clusters, the cluster manager component including a single deployment model, wherein deployment of cluster components to the one or more clusters within the set of clusters is controlled by the cluster manager component on the control cluster; exemplary means for receiving monitor data from two or more clusters for aggregation within a data store associated with the control cluster, the monitor data comprising at least one of metrics data and log data associated with two or more clusters within the set of clusters; and exemplary means for presenting monitor data and/or a set of alerts on a unified dashboard associated with a user interface, the set of alerts identifying multi-cluster status updates associated with the two or more clusters based on the monitor data and at least one threshold.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system managing multiple clusters by a control cluster within a container environment, the system comprising:
   at least one processor; and
   at least one memory comprising computer program code, the at least one memory and the computer program code configured to, with the at least one processor, implement a cluster manager component associated with a control cluster at a cluster layer within the container environment, to cause the at least one processor to:
      deploy, by the cluster manager component, one or more workloads to one or more clusters within a plurality of clusters associated with the container environment;
      receive, by the cluster manager component, monitor data from two or more clusters within the plurality of clusters, the monitor data comprising at least one of metrics data and log data associated with the two or more clusters within the plurality of clusters;
      generate, by the cluster manager component, a combined data set at least by performing analysis on the received monitor data from the two or more clusters; and
      display, by a user interface, the combined data set and a unified set of alerts on a unified dashboard, an alert in the unified set of alerts identifying a warning or a possible issue occurring in real-time across multiple clusters within the plurality of clusters based on the combined data set, wherein the warning or the possible issue includes detection of an execution lag time in the two or more clusters.

2. The system of claim 1, wherein deploying the one or more workloads includes:
   receiving, by the user interface, a workload for deployment on a selected cluster in the plurality of clusters;
   validating the workload for deployment on the selected cluster in the plurality of clusters;
   allowing deployment of the workload onto the selected cluster in response to validation of the workload by the control cluster; and
   denying deployment of the workload on the selected cluster in response to failure to validate the workload.

3. The system of claim 1, wherein the unified dashboard provides a single-pane-of-glass management console presenting the combined data set and the unified set of alerts for multiple clusters in the plurality of clusters; and
   wherein the unified dashboard provides a centralized location for presenting and performing the unified set of alerts.

4. The system of claim 1, wherein receiving the monitor data further includes:
   analyzing the combined data set using at least one threshold;
   monitoring status of the plurality of clusters based on a result of the analyzing of the combined data set; and
   outputting a single representation of a status of the two or more clusters in the plurality of clusters by the unified dashboard.

5. The system of claim 1, wherein the at least one memory and the computer program code is configured to, with the at least one processor, further cause the at least one processor to:
   generate at least one alert in response to the combined data set indicating performance or state of the two or more clusters in the plurality of clusters falling below at least one threshold.

6. The system of claim 1, wherein the at least one memory and the computer program code is configured to, with the at least one processor, further cause the at least one processor to centralize a plurality of logs associated with the plurality of clusters, by the cluster manager component; and
   wherein the at least one memory and the computer program code is configured to, with the at least one processor, further cause the at least one processor to identify at least one issue associated with the plurality of clusters, wherein an alert associated with the at least one issue is output by the user interface.

7. The system of claim 1, the cluster manager component including a single deployment model configured to deploy the one or more workloads;
   wherein the at least one memory and the computer program code is configured to, with the at least one processor, further cause the at least one processor to detect, by the cluster manager component, a change applied to a selected cluster in the plurality of clusters; and
   wherein the at least one memory and the computer program code is configured to, with the at least one processor, further cause the at least one processor to automatically apply, by the deployment model, the detected change to one or more other clusters in the plurality of clusters.

8. A computerized method for managing multiple clusters by a control cluster within a container environment, the method comprising: deploying, by a cluster manager component on a control cluster, one or more workloads to one or more clusters within a plurality of clusters associated with the container environment; receiving, by the cluster manager component, monitor data from two or more clusters, the monitor data comprising at least one of metrics data and log data associated with the two or more clusters within the plurality of clusters; generating, by the cluster manager component, a combined data set at least by performing analysis on the received monitor data from the two or more clusters; and displaying the combined data set and a unified set of alerts on a unified dashboard, an alert in the unified set of alerts identifying a warning or a possible issue occurring in real-time across multiple clusters within the plurality of clusters based on the combined data set, wherein the warning or the possible issue includes detection of an execution lag time in the two or more clusters.

9. The computerized method of claim 8, wherein deploying the one or more workloads includes:
   receiving, by a user interface, a workload for deployment on a selected cluster in the plurality of clusters;
   validating the workload for deployment on the selected cluster in the plurality of clusters;
   allowing deployment of the workload onto the selected cluster in response to validation of the workload by the control cluster; and
   denying deployment of the workload on the selected cluster in response to failure to validate the workload.

10. The computerized method of claim 8, wherein the unified dashboard provides a single-pane-of-glass management console presenting the combined data set and the unified set of alerts for multiple clusters in the plurality of clusters; and wherein the unified dashboard provides a centralized location for outputting and performing the unified set of alerts.

11. The computerized method of claim 8, wherein receiving the monitor data further comprises:
   analyzing the combined data set using at least one threshold;
   monitoring status of a set of clusters based on a result of the analyzing of the combined data set; and
   outputting a single representation of a status of the two or more clusters in the set of clusters by the unified dashboard.

12. The computerized method of claim 8, further comprising:
   generating at least one alert in response to the combined data set indicating performance or state of the two or more clusters in the plurality of clusters falling below at least one threshold.

13. The computerized method of claim 8, further comprising:
   centralizing a plurality of logs associated with the plurality of clusters, by the cluster manager component; and
   identifying at least one issue associated with the plurality of clusters, wherein an alert associated with the at least one issue is output by a user interface device.

14. The computerized method of claim 8, further comprising:
   detecting, by the cluster manager component, a change applied to a selected cluster in a set of clusters; and
   applying the detected change to one or more other clusters in the set of clusters.

15. One or more non-transitory computer storage media having computer-executable instructions for managing multiple clusters by a control cluster within a container environment that, upon execution by a processor, cause the processor to at least: deploy, by a cluster manager component, one or more workloads to one or more clusters within a plurality of clusters associated with the container environment; receive, by the cluster manager component, monitor data from two or more clusters, the monitor data comprising at least one of metrics data and log data associated with the two or more clusters within the plurality of clusters; generate, by the cluster manager component, a combined data set at least by performing analysis on the received monitor data from the two or more clusters; and display, by a user interface, the combined data set and a unified set of alerts on a unified dashboard, an alert in the unified set of alerts identifying a warning or a possible issue occurring in real-time across multiple clusters within the plurality of clusters based on the combined data set, wherein the warning or the possible issue includes detection of an execution lag time in the two or more clusters.

16. The one or more computer storage media of claim 15, wherein deploying the one or more workloads includes:
   receiving, by the user interface, a workload for deployment on a selected cluster in the plurality of clusters;
   validating the workload for deployment on the selected cluster in the plurality of clusters;
   allowing deployment of the workload onto the selected cluster in response to validation of the workload by the control cluster; and
   denying deployment of the workload on the selected cluster in response to failure to validate the workload.

17. The one or more computer storage media of claim 15, wherein receiving the monitor data further comprising:
   analyzing the combined data set using at least one threshold;
   monitoring status of a set of clusters based on a result of the analyzing of the combined data set; and
   outputting a single representation of a status of the two or more clusters in the set of clusters by the unified dashboard.

18. The one or more computer storage media of claim 15, wherein the computer-executable instructions, upon execution by a processor, further cause the processor to at least:
   generate at least one alert in response to the combined data set indicating performance or state of the two or more clusters in the plurality of clusters falls below at least one threshold.

19. The one or more computer storage media of claim 15, wherein the unified dashboard provides a single-pane-of-glass management console presenting the combined data set and alerts for multiple clusters in the plurality of clusters; and
   wherein the unified dashboard provides a centralized location for outputting the unified set of alerts.

20. The one or more computer storage media of claim 15, wherein the computer-executable instructions, upon execution by a processor, further cause the processor to at least:
   detect, by the cluster manager component, a change applied to a selected cluster in the plurality of clusters; and
   apply the detected change to one or more other clusters in the plurality of clusters.

\* \* \* \* \*